Patented Jan. 16, 1923.

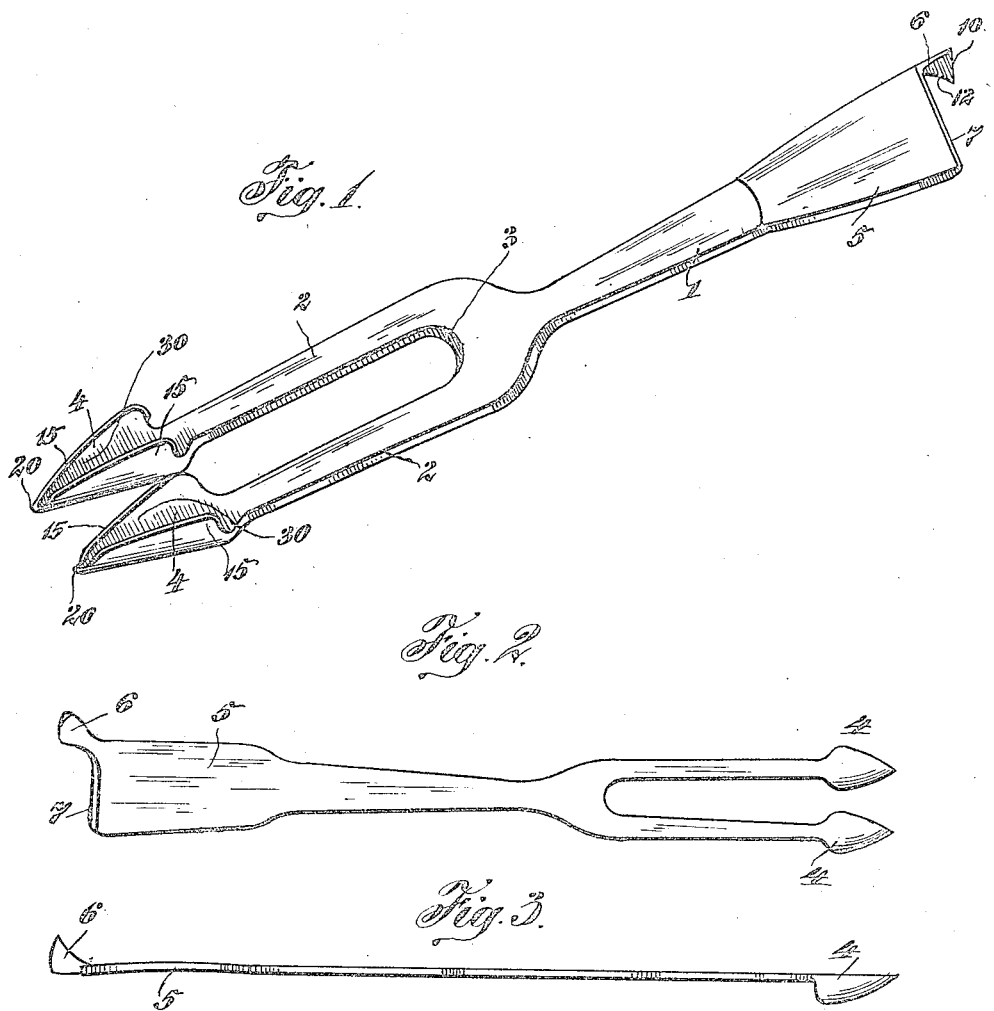

1,442,577

UNITED STATES PATENT OFFICE.

JOSEPH KUGEL AND PHILLIP R. STRAUSS, OF CINCINNATI, OHIO.

FRUIT SEEDER AND PEELER.

Application filed September 26, 1921, Serial No. 503,451. Renewed December 15, 1922.

*To all whom it may concern:*

Be it known that we, JOSEPH KUGEL, a citizen of the United States, residing at the city of Cincinnati, in the county of Hamilton and State of Ohio, and PHILLIP R. STRAUSS, a citizen of the United States, residing at the city of Cincinnati, in the county of Hamilton and State of Ohio, have jointly invented certain new and useful Improvements in Fruit Seeders and Peelers, of which the following is a specification.

Our present invention relates to a new article of manufacture to be used in removing the seed from fruit and in peeling fruit, relating more particularly to the removal of seed from grapefruit and the like and to the peeling of oranges and the like, although it may be used in connection with other fruits.

It is very simple in construction, cheap of manufacture and highly efficient in use, and is an article of great utility.

We will describe the instrument as it is used in connection with grapefruit, as a seeder. It is a well-known fact that grapefruit contain a great number of seeds and that it is very desirous, in fact, a necessity to remove them. With our instrument we can do this without cutting out the center of the fruit, losing any of the pulp or juice and can do it quickly leaving the pulp in an original condition and state; in using the same as a peeler, we will describe it as used in connection with an orange.

The various features and advantages of our invention will readily become apparent from the following specification and claims.

In the accompanying drawing forming part of this specification:

Fig. 1, is a perspective view, enlarged.
Fig. 2, is a plan view, and
Fig. 3, is a side view.

The tool or instrument consists of a handle formed of the parts 1 and 5, the part 1 extended forward to the point 3, where it divides or becomes bifurcated forming two prongs 2, 2, which terminate in small scoops or seed removers 4, which are formed by turning up wings 15, 15, at each side, widest at the top running to a point 20 where they are partly cut away; this forms a somewhat triangular or spear shape pocket through which passes the groove or channel 30. The handle part 5 is slightly arched, as shown in Fig. 3, and at its outer edge, this handle part 5 terminates in a sharpened edge 7. At one side of the sharpened edge 7 of the handle part 5, we place a cutter 6, preferably shaped as shown, and having sharpened edges 10 and 12.

In using the device the little scoops or pocket ends 4 are inserted adjacent to the seeds so that said seeds will slip into the groove part 30, when they can be pulled or raised out, any juice will run out through the grooves and leave at the point 20, or remain in the pulp; this operation can be repeated until all the seeds are removed. The points 20 render it easy to insert the device in the pulp of the fruit and the pockets readily receive the seeds, as they are shaped to accommodate said seeds whether they are large or small or any peculiar contour.

In peeling an orange for example, the cutter 6 cuts the groove and division line in the orange skin and by pushing forward the edge 7 passes under said skin and lifts it out to a degree, so that, by continuous movement the skin is cut and lifted in any direction desired around the periphery of the orange; this can be done quickly, uniformly and evenly over the face of the pulp or inside part of the orange, without marring the same.

While the pockets 4 are of a triangular or spear shape at the back, they are also of this shape in front and at their sides, forming an unique pocket or receptacle for receiving and holding the seeds for removal, and the ends 20 being shaped as shown to allow for a ready insertion of said pockets into the pulp of the fruit.

By using our device the seeds of a grapefruit or analogous fruit can be removed very rapidly, and very satisfactorily and leaving the pulp in a normal and inviting condition.

It will also be seen that an orange or analogous fruit can be very readily pared by the construction shown at the end of the handle. While we have shown two prongs, we may use only one or a multiplicity of prongs, and we may make the same of any other form and configuration which may be found serviceable in practice, and the paring end of the device may be also differently shaped and formed.

What we claim as new and our invention and desire to secure by Letters Patent is:

1. In a device of the character described, a body part therefor, said body part carrying extensions, said extensions lying in the same plane with their edges toward each other, said extensions at their extremity turned up to form seed-removing pockets, provided with open faces, said pockets and faces widest at the top and tapering downwardly to a point, said pockets both similarly formed and both disposed with their open faces in alignment with said extensions.

2. In a device of the character described, a body part, extensions thereon, said extensions ending in tapered seed-removing pockets, said extensions and pockets spaced with their edges lying toward each other, and said pockets partially cut away and pointed at their extremity.

In testimony whereof, we affix our signatures at Cincinnati, Ohio, this 23rd day of September, 1921.

JOSEPH KUGEL.
PHILLIP R. STRAUSS.